(12) United States Patent
Massie et al.

(10) Patent No.: US 8,447,707 B2
(45) Date of Patent: May 21, 2013

(54) AUTOMATED CONTROL OF A POWER NETWORK USING METADATA AND AUTOMATED CREATION OF PREDICTIVE PROCESS MODELS

(75) Inventors: Darrell D. Massie, Fort Montgomery, NY (US); Michael A. Miller, Shreveport, LA (US); Peter S. Curtiss, Boulder, CO (US)

(73) Assignee: Intelligent Power and Energy Research Corporation, Fort Montgomery, NY (US)

( * ) Notice: Subject to any disclaimer, the term of this patent is extended or adjusted under 35 U.S.C. 154(b) by 408 days.

(21) Appl. No.: 12/817,651

(22) Filed: Jun. 17, 2010

(65) Prior Publication Data

US 2011/0071970 A1    Mar. 24, 2011

Related U.S. Application Data

(60) Provisional application No. 61/218,512, filed on Jun. 19, 2009.

(51) Int. Cl.
*G06F 15/18* (2006.01)

(52) U.S. Cl.
USPC .......................................................... 706/12

(58) Field of Classification Search ...................... 706/12
See application file for complete search history.

(56) References Cited

U.S. PATENT DOCUMENTS

| | | | |
|---|---|---|---|
| 5,237,507 A | 8/1993 | Chasek | |
| 6,338,009 B1 | 1/2002 | Sato et al. | |
| 6,347,027 B1 | 2/2002 | Nelson et al. | |
| 6,486,569 B2 | 11/2002 | Couture | |
| 6,535,797 B1 | 3/2003 | Bowles et al. | |
| 6,866,527 B2 | 3/2005 | Potega | |
| 7,231,280 B2 * | 6/2007 | Costa | 700/286 |
| 7,278,120 B2 | 10/2007 | Rahmat et al. | |
| 7,430,459 B1 | 9/2008 | Papalia et al. | |
| 7,478,416 B2 | 1/2009 | Edson | |
| 7,590,472 B2 | 9/2009 | Hakim et al. | |
| 8,350,412 B2 * | 1/2013 | Massie et al. | |
| 2002/0167174 A1 | 11/2002 | Haass et al. | |

(Continued)

OTHER PUBLICATIONS

International Search Report & Written Opinion of the International Searching Authority for PCT/US2010/038968, dated Jan. 20, 2011.
International Search Report & Written Opinion of the International Searching Authority for PCT/US2010/038974, dated Jan. 28, 2011.

(Continued)

*Primary Examiner* — Michael B Holmes
(74) *Attorney, Agent, or Firm* — Kevin P. Radigan, Esq.; Heslin Rothenberg Farley & Mesiti P.C.

(57) ABSTRACT

Automated control of a power network is provided by: providing multiple intelligent power controllers (IPCs) associated with multiple components of the power network, each IPC being associated with a different component; obtaining at least one raw data stream representative of at least one operational aspect of at least one component of the multiple components; and automatically associating, by at least one intelligent power controller associated with at least one component, metadata with the at least one raw data stream to produce at least one self-identifying data stream. The associated metadata describes one or more characteristics of the at least one raw data stream, and the at least one self-identifying data stream facilitates automated creation of predictive process models to assist in automated control of the power network by an IPC manager of the power network.

21 Claims, 11 Drawing Sheets

U.S. PATENT DOCUMENTS

| | | |
|---|---|---|
| 2004/0107273 A1 | 6/2004 | Biran et al. |
| 2005/0154701 A1 | 7/2005 | Parunak et al. |
| 2007/0124607 A1 | 5/2007 | Fuch |
| 2007/0239372 A1 | 10/2007 | Schweitzer |
| 2008/0114499 A1 | 5/2008 | Hakim et al. |
| 2008/0238750 A1 | 10/2008 | Kris et al. |
| 2008/0281663 A1 | 11/2008 | Hakim et al. |
| 2009/0112375 A1 | 4/2009 | Popescu |
| 2009/0146497 A1 | 6/2009 | Taylor et al. |
| 2010/0320838 A1 | 12/2010 | Massie et al. |

OTHER PUBLICATIONS

Massie et al., Office Action for U.S. Appl. No. 12/817,645, filed Jun. 17, 2010 (U.S. Publication No. 2010/0320838 A1), dated Jun. 21, 2012.

Massie et al., Notice of Allowance for U.S. Appl. No. 12/817,645, filed Jun. 17, 2010 (U.S. Publication No. 2010/0320838 A1), dated Nov. 16, 2012.

* cited by examiner

. . .
. . .
- Generator1.ControlSignal.OnOff
- Generator1.FuelSystem.Fuel.Diesel
- Generator1.FuelSystem.Fuel.FlowRate
- Generator1.FuelSystem.FuelTank.Level
- Generator1.FuelSystem.Throttle.PercentFull (diagnostics)
- Generator1.ElectricalSystem.Switch.Status. OnOff
- Generator1.ElectricalSystem.Voltage1.Volts
- Generator1.ElectricalSystem.Voltage2.Volts
- Generator1.ElectricalSystem.Voltage3.Volts
- Generator1.ElectricalSystem.Current1.Amperes
- Generator1.ElectricalSystem.Current2.Amperes
- Generator1.ElectricalSystem.Current3. Amperes
- Generator1.ElectricalSystem.PowerFactor
- Generator1.ElectricalSystem.OutOfPhase.InOut
- Generator1.ElectricalSystem.Frequency.Hz
- Generator1.ElectricalSystem.TotalkW.kW
- Generator1.ElectricalSystem.BattleShortMode
- Generator1.ElectricalSystem.EmergencyShutDown
- Generator1.EngineSystem.OilPressure.PSI
- Generator1.EngineSystem.CoolantTemperature.DegreesF
- Generator1.EngineSystem.EngineSpeed.RPM
- Generator1.AmbientAirTemperature.DegreesF
. . .
. . .

FIG. 6A

. . .
. . .
- ECU1.ControlSignal.OnOff
- ECU1.ThermostatSignal.OnOff
- ECU1.ElectricalSystem.MaxPowerDraw.kW
- ECU1.EnteringAirTemperature.DegreesF
- ECU1.ExitAir Temperature.DegreesF
- ECU1.Refrigerant.Pressure.PSI
- ECU1.ArnbientAirTemperature.DegreesF
- ECU1.ByPassMode.YesNo
- ECU1.LoadShed.CompressorOff
- ECU1.Heating.HalfHeatFullHeat
. . .
. . .

FIG. 6B

MODEL TEMPLATE

900

```
<modeltemplate>
 <template name =" GeneratorFuelEstimator" modeltype="equation" interval="60" />
 <equation text="(GeneratorOutput*RatedGeneratorCapacity) ^0.5" >
 </equation>
 <inputs>
  <input index="1" description="GeneratorOutput">
   <tagsearch>
    <device tag="generator-diesel" />
    <sensor tag="power" />
   < /tagsearch>
  </input>
  <input index="2" description="RatedGeneratorCapacity">
   <tagsearch>
    <device tag="generator-diesel" />
    <sensor tag="power" />
    <property tag="property-MaxExpected" />
   </tagsearch>
  </input>
 </inputs>
 <outputs>
  <output index="1"
   <tagsearch>
    <model-device tag ="model" />
    <model-sensor tag="estimated-fuel-use" />
   </tagsearch>
  </output>
 </outputs>
</model template>
```

901 — HEADER PORTION

902 — PATTERN MATCHING CRITERIA

903 — OUTPUT PORTION

FIG. 9

AUTOMATED CONTROL OF A POWER NETWORK USING METADATA AND AUTOMATED CREATION OF PREDICTIVE PROCESS MODELS

CROSS-REFERENCE TO RELATED APPLICATION

This application claims the benefit of U.S. Provisional Application No. 61/218,512, filed Jun. 19, 2009, which is hereby incorporated herein by reference in its entirety, and is related to co-filed application Ser. No. 12/817,645, entitled "Dynamically Controlling Configuration of a Power Grid Comprising One or More Stand-Alone Sub-Grids," which is also hereby incorporated herein by reference in its entirety.

STATEMENT REGARDING FEDERALLY SPONSORED RESEARCH OR DEVELOPMENT

This invention was made, in part, under Grant Number W909MY-09-C-0025 from U.S. Army Communications-Electronics Command Contracting Center Washington. Accordingly, the United States Government may have certain rights in the invention.

TECHNICAL FIELD

The present invention relates generally to the field of electrical power control, and more particularly, to an automated process and system for dynamically monitoring and controlling one or more components of a power network.

BACKGROUND OF THE INVENTION

In a conventional power generation and distribution network, electrical power is transmitted across multiple levels of components, that is, from power generating source components, through various distribution components to one or more load components. Existing power networks lack intelligent automated control over the components of the power network. While monitoring systems have been employed to monitor electricity flowing through a power generation and distribution network, and to affect operation of load components based on, for example, peak and off-peak power usage, today's networks cannot intelligently utilize monitored operational aspects of components at the different levels of the network to effectuate automated control of one or more of the components based on one or more operational goals.

BRIEF SUMMARY OF THE INVENTION

The shortcomings of the prior art are overcome and additional advantages are provided through a method of facilitating automated control of a power network. The method includes: providing multiple intelligent power controllers (IPCs) associated with multiple components of the power network, each IPC being associated with a different component of the multiple components of the power network; obtaining at least one raw data stream representative of at least one operational aspect of at least one component of the multiple components; and automatically associating, by the at least one IPC associated with the at least one component, metadata with the at least one raw data stream to produce at least one self-identifying data stream, the metadata describing one or more characteristics of the at least one raw data stream, and the at least one self-identifying data stream facilitating automated control of the power network.

In a further aspect, a method of facilitating automated control of a power network is provided. The method includes providing multiple intelligent power controllers (IPCs), each IPC being coupled to a respective component of multiple components of the power network and each IPC of the multiple IPCs being operable to: access at least one raw data stream representative of at least one operational aspect of the respective component of the multiple components of the power network; automatically associate metadata with the at least one raw data stream to produce at least one self-identifying data stream accessible by other IPCs of the multiple IPCs, the metadata describing one or more characteristics of the at least one raw data stream; access self-identifying data streams of other IPCs of the multiple IPCs; facilitate automated control of the power network, responsive to being selected IPC manager of the power network, using the self-identifying data streams to generate at least one predictive process model from at least one model template, the at least one predictive process model facilitating an evaluation of one or more potential control actions to control one or more components of the multiple components of the power network; and automatically control the power network, responsive to being selected IPC manager of the power network, by employing one or more predictive process models in evaluating the one or more potential control actions, and producing a set of control signals based on the evaluation of the one or more potential control actions, the set of control signals controlling one or more control points associated with one or more components of the multiple components of the power network.

In another aspect, a system facilitating automated control of a power network is provided. The system includes multiple intelligent power controllers (IPCs) associated with multiple components of the power network, each IPC being associated with a different component of the multiple components of the power network, wherein at least one IPC of the multiple IPCs: obtains at least one raw data stream representative of at least one operational aspect of at least one component of the multiple components; and automatically associates metadata with the at least one raw data stream to produce at least one self-identifying data stream, the metadata describing one or more characteristics of the at least one raw data stream, and the at least one self-identifying data stream facilitating automated control of the power network.

In a further aspect, a power network is provided. The power network includes multiple power components, the multiple power components including at least one source component and at least one load component, and further includes an automated control system for controlling the power network. The automated control system includes multiple intelligent power controllers (IPCs) associated with the multiple power components, each IPC being associated with a different power component of the multiple power components, wherein at least one IPC of the multiple IPCs: obtains at least one raw data stream representative of at least one operational aspect of at least one power component of the multiple power components; and automatically associates metadata with the at least one raw data stream to produce at least one self-identifying data stream, the metadata describing one or more characteristics of the at least one raw data stream, and the at least one self-identifying data stream facilitating automated control of the power network.

Additional features and advantages are realized through the techniques of the present invention. Other embodiments and aspects of the invention are described in detail herein and are considered part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts exemplary self-identifying data streams produced by an IPC by associating appropriate metadata with multiple raw data streams obtained by the IPC, in accordance with an aspect of the present invention;

FIG. 6B depicts further exemplary self-identifying data streams produced by another IPC by associating appropriate metadata with multiple other raw data streams obtained by the another IPC, in accordance with an aspect of the present invention;

FIG. 9 depicts one example of a model template utilized by a modeler function of the IPC manager of FIG. 8 to generate one or more predictive process models, in accordance with an aspect of the present invention;

DETAILED DESCRIPTION

Provided herein is an automated, distributed control facility for a power network. In accordance with an aspect of the present invention, automated control is facilitated by associating intelligent power controllers (IPCs) with selected components of the power network. The IPCs are configured (e.g., programmed) to automatically associate metadata with raw data streams representative of various operational aspects of the associated components to produce self-identifying data streams. The self-identifying data streams are then used to generate predictive process models, which in turn are employed to selectively produce control signals for controlling one or more control points associated with one or more components of the power network. The control signals could cause any number of a variety of actions, for example, actions to set one or more operating levels of a component, or actions to control when one or more components turn on or off. Advantageously, power generation and utilization optimizations are performed by one or more IPC managers to produce a set of control signals that direct power component usage and avoid undesirable or inefficient operational effects, such as power overload or fuel-exhaustion.

Reference is made below to the drawings (which are not drawn to scale for ease of understanding), wherein the same reference numbers used throughout different figures designate the same or similar components.

Figure 1:
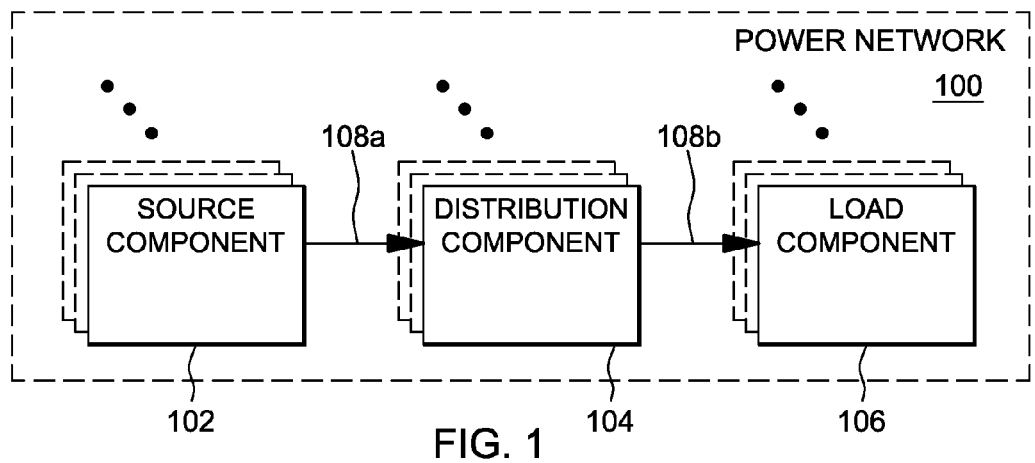
FIG. 1 illustrates one embodiment of a power network comprising multiple components to utilize an automated control facility, in accordance with an aspect of the present invention.

FIG. 1 illustrates one embodiment of a power network, generally denoted 100, to employ an automated control facility, in accordance with an aspect of the present invention. In this example, power network 100 includes one or more source components 102, one or more distribution components 104, and one or more load components 106. A source component 102 may be, for example, a generator with an individual fuel supply, for instance a gasoline-powered electrical generator. A distribution component 104 facilitates distributing power from one or more source components 102 to one or more load components 106. A non-limiting example of a distribution component is, for instance, a power flow controller, such as a power distribution box that splits available power into multiple distribution lines for supply to any number of individual load components 106. Additional examples of power flow controllers include, but are not limited to, feeder control boxes and master/slave controllers. Load components 106 are power-consuming components. As one example, power network 100 may be a tactical power grid, such as a tactical power grid of an Armed Services camp, wherein the one or more source components 102 are one or more mobile gasoline-powered electrical generators, the one or more distribution components 104 include a power flow controller, and the one or more load components 106 comprise plug-in loads, environmental control units, mobile battery recharging loads, soldier-based recharging loads, etc.

The multiple components of power network 100 are electrically coupled via one or more power distribution links 108a and 108b, which facilitate distributing power from source components 102, through distribution components 104, to load components 106 of power network 100.

Figure 2:
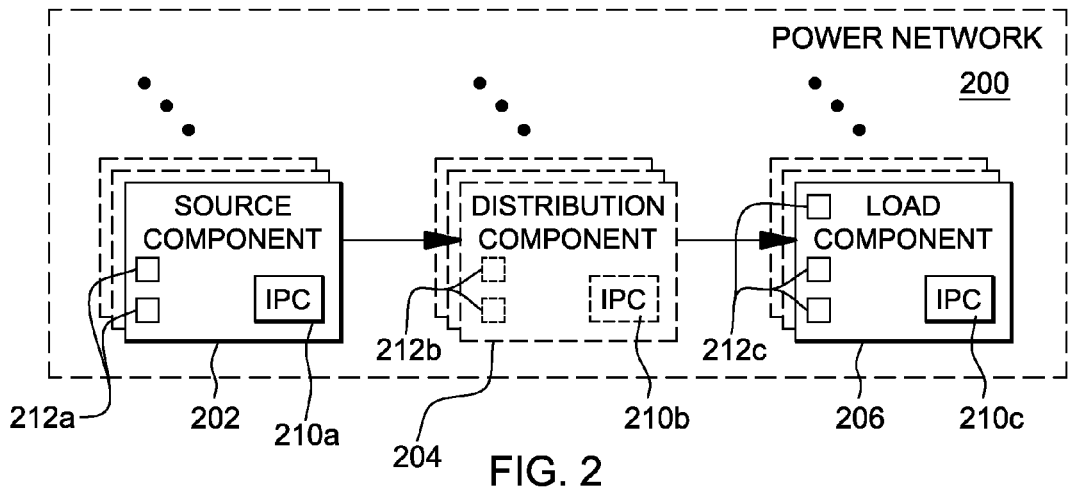
FIG. 2 illustrates the power network of FIG. 1 shown with an automated control facility comprising multiple distributed intelligent power controllers (IPCs), in accordance with an aspect of the present invention.

FIG. 2 depicts a power network 200, such as described above in connection with FIG. 1, in combination with an automated, distributed control facility, in accordance with an aspect of the present invention. The control facility is implemented in power network 200 via a plurality of intelligent power controllers (IPCs) 210a, 210b, 210c, each of which is associated with a respective component, that is, source component 202, distribution component 204 and load component 206, of power network 200. (Note that distribution components 204 are optional within power network 200, and are therefore shown dashed.)

Source components 202, distribution components 204 (if present), and load components 206 may be power network components such as described above, but one or more of these power network components have associated therewith one or more data sources 212a, 212b, 212c. As used herein, a data source provides one or more data streams related to one or more operational aspects of its associated component. These data streams are provided in the form of raw data streams to the IPC associated with the component. By way of example, a data source may be a sensor associated with a component. For instance, in the case of a mobile generator (i.e., source component), multiple data sources may be sensors that sense fuel flow rate to the generator, power output of the generator, or current, voltage or power factor on one of a three-phase power signal output from the generator. The raw data streams produced by the data sources may include timestamps and corresponding process values (in appropriate engineering units) of data provided by the data sources.

As noted, each IPC is associated with a different component of the power network 200. Thus, the automated control facility presented herein is distributed across power network 200. In the example of FIG. 2, IPC 210a is associated with one source component 202, IPC 210b is associated with one distribution component 204, and IPC 210c is associated with one load component 206.

The IPCs may be associated with multiple components of the power network by any one of several means including, but not limited to, coupling the IPC to the respective component, or embedding the IPC within the component. The IPCs may be adapted to conveniently associate with the components of the power network. For instance, in one embodiment, the IPC is in the form of a hardware computing platform, such as a single board computer, comprising a combination of hardware and software components. The single board computer may be adapted to conveniently interface with the associated component of the power network, for example by integrating with one or more existing features of the component. It should be understood, however, that an IPC may take any form, including an entirely hardware form, or a part hardware and part software form. Additionally, the IPC may comprise a stand-alone box that couples to the component, for instance via a wired or wireless connection. Moreover, IPCs may vary in form across a power network, and thus be individually adapted according to the particular component with which they are associated. For example, an IPC coupled to source component 202 may comprise an embedded chip, whereas an IPC coupled to load component 206 may comprise a standalone box connected to load component 206 via a wire. Thus, the particular form that an IPC can take can vary. Notwithstanding this, in one implementation, the IPCs are identically produced.

Once associated with their respective component, a function of the IPCs is to associate metadata with one or more raw data streams generated by one or more data sources associated with, and providing output representative of, at least one operational aspect of the component.

Figure 3:
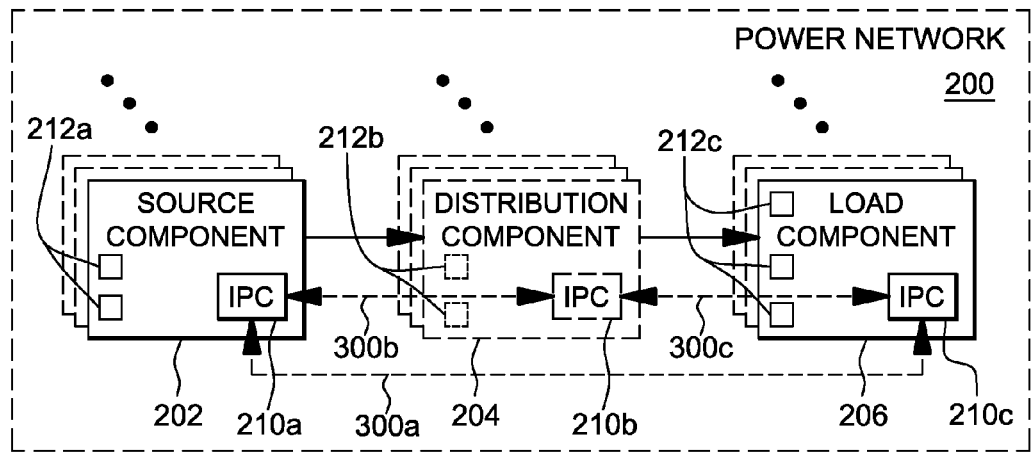
FIG. 3 depicts the power network and automated control facility of FIG. 2, and illustrates intelligent power controller communication links between the distributed intelligent power controllers, in accordance with an aspect of the present invention.

In one aspect, the multiple IPCs of the power network communicate with each other to facilitate automated control of the power network. FIG. 3 depicts the power network and automated control facility of FIG. 2 and illustrates IPC communication links 300a, 300b, 300c between the IPCs of the power network. The IPC communication links represent potential two-way communication between any two IPCs of the power network. In the example of FIG. 3, IPC communication link 300a allows communication between IPC 210a of source component 202 and IPC 210c of load component 206. If an optional distribution component 204 is present, then IPC communication link 300b facilitates communication between IPCs 210a and 210b and IPC communication link 300c facilitates communication between IPCs 210b and 210c. Additionally, IPCs need not communicate only between different levels of the power network. For example, IPCs associated with two or more source components, or two or more distribution components, or two or more load components may also communicate with each another, as will be apparent to those skilled in the art from the description provided herein.

Communication between IPCs may comprise exchanging data between IPCs across one or more of the IPC communication links. In one example, one IPC may send data to another IPC across an IPC communication link. Additionally, or alternatively, one IPC may retrieve data from another IPC across an IPC communication link. Communication may be secured, for example, by encrypting the data exchanged or by utilizing secure communications paths, the access to which may be restricted. Communication links may comprise conventional wired or wireless network communication links implemented via any known protocol or specification, for instance a serial, Ethernet, power-line (information over power line), WiFi, and/or ZigBee implementation. In this manner, the IPCs of a power network may form a mesh network to communicate with one another to facilitate automated control of the power network, as described herein.

Figure 4:
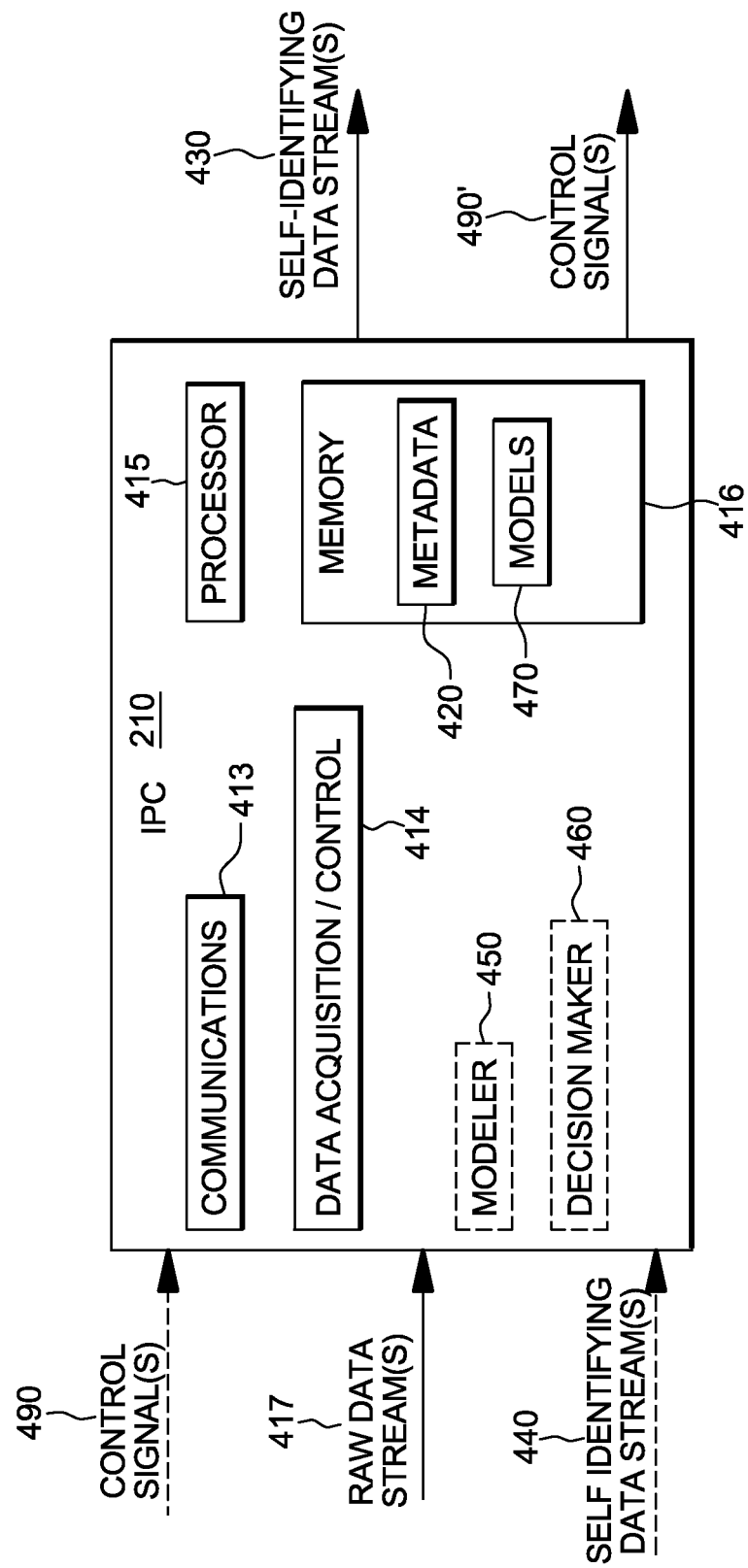
FIG. 4 depicts one embodiment of an intelligent power controller for the automated control facility depicted in FIGS. 2 and 3, in accordance with an aspect of the present invention.

In one embodiment, the IPCs of FIGS. 2 and 3 are identical, with FIG. 4 depicting one example of an IPC 210. The illustrated IPC 210 includes a communications interface 413, which facilitates communications with, for example, other IPCs. Additionally, communications interface 413 facilitates communication with control points on the component (i.e., the source component, distribution component, or load component of the power network) associated with IPC 210. IPC 210 also comprises a data acquisition and control layer 414, which provides a common and consistent way of accessing data, for instance raw data streams from the data sources as described above, and for controlling processes of IPC 210. For example, data acquisition and control layer 414 may provide services for process monitoring and communication. Both communications interface 413 and data acquisition and control layer 414 run via a processor 415 and its associated memory 416.

Memory 416 comprises metadata 420, which may comprise one or more metadata description files configured (e.g., programmed) for automatically associating the appropriate metadata with one or more raw data streams 417 to produce at least one self-identifying data stream 430.

Figure 5:
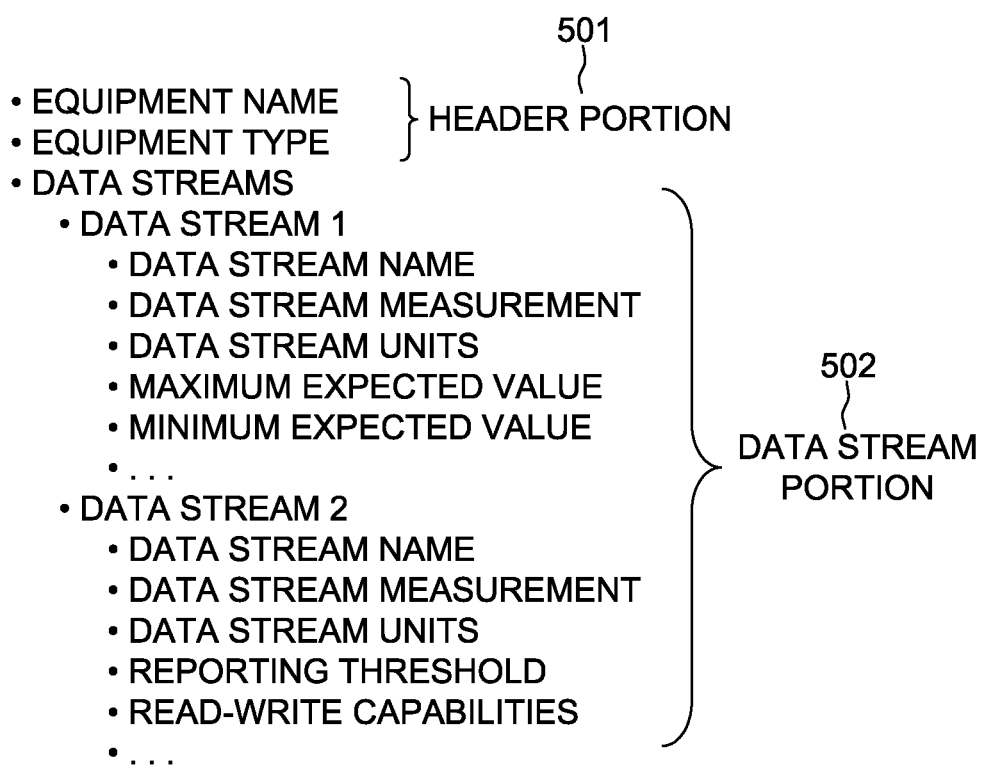
FIG. 5 is an example of a metadata description file for an IPC, such as depicted in FIG. 4, describing various characteristics and operational aspects of an associated component of a power network, in accordance with an aspect of the present invention.

FIG. 5 is one example of a metadata description file programmed for an IPC and describing various characteristics of the associated component of the power network, including various characteristics of multiple raw data streams produced by the data sources of the associated component. The metadata description files store data in standardized formats that can be replicated across different platforms and equipment type. In one implementation, the metadata description file is a template used by the IPCs to associate metadata with one or more raw data streams to produce one or more self-identifying data streams. It may include information about the associated component, the sensor providing the raw data stream, engineering units, and other aspects of the one or more raw data streams associated with the respective component of the power network. The metadata description file can be written in any appropriate format including, but not limited to, XML or HTML.

Depicted in FIG. 5 is one example of a metadata description file 500, which comprises a header portion 501 and a data stream portion 502. Header portion 501 provides characteristics common to the data streams associated with the particular component of the power network. For instance, header portion 501 may comprise an equipment name and equipment type corresponding to a name and type of the component described by the template. Data stream portion 502 comprises a listing of one or more data streams associated with the particular component of the power network. For example, multiple raw data streams of a source component may be generated by multiple data sources associated with the source component. For each data stream listed in data stream portion 502, one or more values unique to that data stream associated with that particular component may be provided. A non-limiting list of values that may be associated with a data stream include data stream name, data stream measurement, data stream units, expected values of data of the data stream, reporting thresholds, and read-write capabilities. However, it should be understood that data stream portion 502 may comprise any appropriate values to be associated with a particular data stream of the respective data source as desired to facilitate control of the power network.

Returning to FIG. 4, IPC 210 obtains raw data stream(s) 417 as input. As noted above, a raw data stream comprises monitored, non-self-identifying data from one or more data sources, such as those described above with reference to FIG. 2. The data streams are representative of operational aspects of the associated component of the power network. As one or more raw data streams 417 are received, IPC 210 automatically associates appropriate metadata 420, for instance one or more metadata description files, with the raw data streams 417, to produce one or more self-identifying data streams 430.

FIG. 6A depicts (by way of example only) multiple self-identifying data streams produced by associating metadata with multiple raw data streams as described herein. Depicted in FIG. 6A is a sequence of data strings that include information about a component described by the self-identifying data streams. In this example, a generator named "Generator1" is described, including various operational aspects of Generator1's fuel system, electrical system, and engine system, and other operational aspects as well. FIG. 6B is similar to FIG. 6A, but describes a different component. In the example of FIG. 6B, a load component (i.e., an Environmental Control Unit, "ECU1") is described. Self-identifying data streams may identify the component of origin, location of the one or more data sources on the component, engineering units of the measurements received, and an original polling type and interval of such measurements, for instance whether the measurements are reported by exception or, alternatively, when a next data sample can be expected.

Continuing with FIG. 4, IPC 210 may produce and output one or more self-identifying data streams 430. Self-identifying data streams 430 may be output to, or accessed by, for example, an IPC manager of the power network for facilitating automated control of the power network by the IPC manager, as explained below.

Memory 414 of IPC 210 may also include predictive process models 470. As described further below, predictive process models may be generated and used by an IPC manager(s) to facilitate control of the power network by controlling operation of one or more components in a power network. Each IPC of the power network may host one or more predictive process model(s), which may be employed by an IPC manager in producing control signals which may then be passed to an IPC as incoming control signals 490 to control operation of a component with which the IPC is associated. Incoming control signals 490 may be received by IPC 210 and relayed from IPC 210 as outgoing control signals 490' for controlling one or more control points of the component of the power network with which IPC 210 is associated. For instance, control signals 490 may simply pass through IPC 210 and be output in an identical format as control signals 490'. Alternatively, control signals 490 may comprise signals that may cause IPC 210 to issue control signals 490' in a modified format of incoming control signals 490, or in an entirely new format. When output, control signals 490' control one or more control points of the component with which IPC 210 is associated. A control point could be any aspect of the associated component that may be manipulated to control or dictate operation of the component. One example of this is an electronic on/off switch to turn a component on or off. In one example, control signals 490/490' may comprise one or more control signals for toggling the on/off switch of the component associated with IPC 210.

Predictive process models 470 define a cause and effect relationship. This cause and effect relationship is used by an IPC manager to determine whether and when control signals 490 should be issued to IPC 210 for controlling a component with which IPC 210 is associated. The predictive process models 470 hosted on IPC 210 may change from time to time. Initially, they may be generated by IPC 210 itself. However, over time, predictive process models 470 may be replaced, deleted, or altered by actions of an IPC manager. Further discussion regarding predictive process models, control signals, and an IPC manager is provided below with reference to FIG. 8.

Continuing with FIG. 4, IPC 210 may optionally comprise a modeler 450, a decision maker 460, and incoming self-identifying data streams 440. These aspects of IPC 210 may be employed if IPC 210 is selected to be an IPC manager of the power network. In one embodiment, each IPC of the power network comprises modeler 450 and decision maker 460, and may be configured to receive self-identifying data streams 440. This enables any IPC of the power network to function as an IPC manager, if selected to do so. In this manner, management of the power network is provided in a decentralized manner by any IPC of the power network, without a requirement for a separate manager system of the power network, such as a supervisory control and data acquisition (SCADA) system. If IPC 210 is selected to be an IPC manager, then the IPC facilitates automated control of the power network. For instance, it performs generation of final predictive process models using received self-identifying data streams 440 provided by or obtained from one or more other IPCs of the power network, as described further below.

Figure 7:
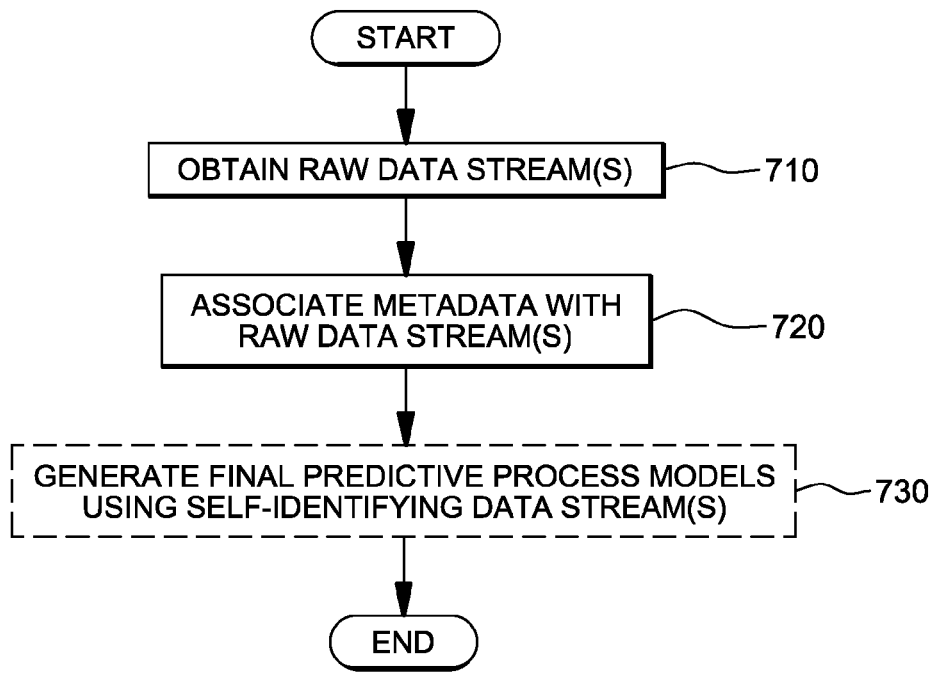
FIG. 7 depicts one embodiment of processing implemented by the intelligent power controller of FIG. 4 to facilitate automated control of the power network, in accordance with an aspect of the present invention.

FIG. 7 depicts one example of processing implemented by IPC 210 (FIG. 4) for facilitating automated control of the power network of FIGS. 2 and 3. Processing begins with IPC 210 obtaining one or more raw data streams as input, STEP 710. As described above, the raw data streams may comprise monitored data from one or more data sources associated with the respective component. At STEP 720, the IPC automatically associates the appropriate metadata with the raw data streams to produce one or more self-identifying data streams, which then may be output to or read by another IPC of the power network (functioning as IPC manager) as self-identifying data streams 430. If IPC 210 is selected to be an IPC manager of the power network, then the IPC may generate final predictive process models using self-identifying data streams 440 from other IPCs in the power network, STEP 730.

One or more IPC manager(s) of a power network are responsible for managing automated control of the power network. An IPC manager may be, for example, an IPC associated with a component of the power network, or may be a standalone IPC within the power network. An IPC manager may be automatically selected from the IPCs of the power network to operate as an IPC manager. In one embodiment, each IPC of the power network is uniquely identified via a unique address, for instance an IP address, and an IPC manager is selected based on those IP addresses. For instance, the IPC assigned a lowest or highest IP address may be automatically selected an IPC manager. Alternatively, other techniques may be employed for selecting an IPC manager, for instance based on when each IPC is incorporated into the power network. Once selected, an IPC manager explores the power network to identify other IPCs within the power network. An IPC manager sends signals to explore based on, for example, IP addresses of the IPCs, and may query and communicate with the other IPCs of the power network via the IPC communication links depicted in FIG. 3. For instance, an IPC manager may communicate with other IPCs of the power network to access one or more self-identifying data streams of the other IPCs to facilitate automated control of the power network.

Figure 8:
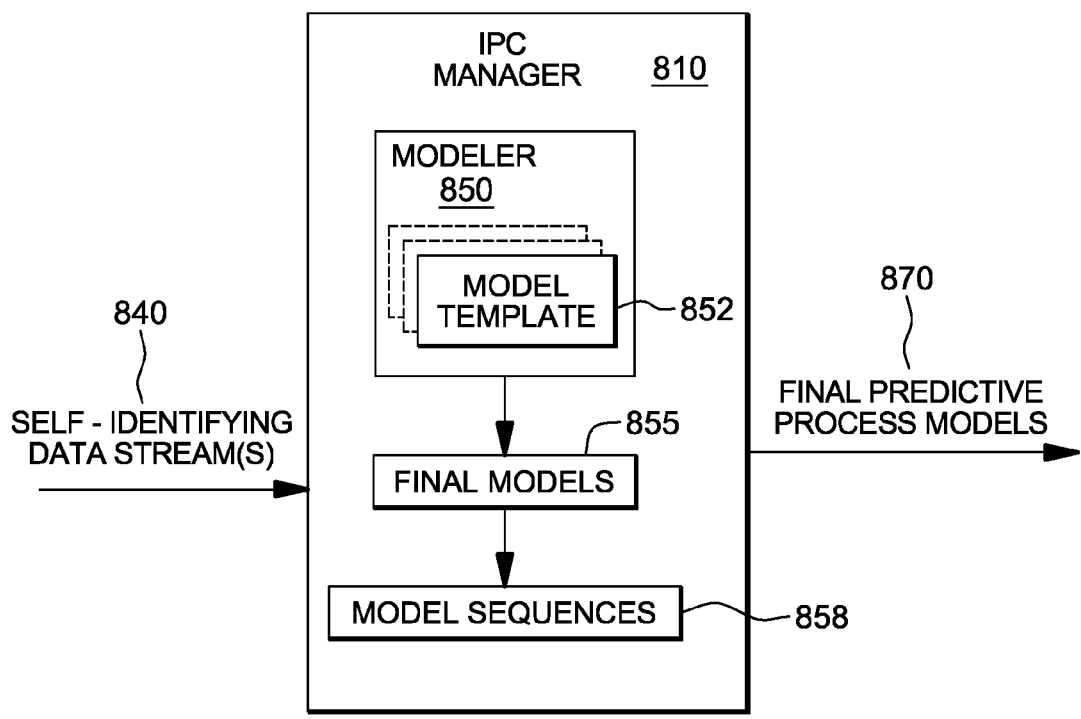
FIG. 8 depicts one embodiment of an intelligent power controller of the automated control facility, functioning as an IPC manager to facilitate automated control of the power network, in accordance with an aspect of the present invention.

FIG. 8 depicts one embodiment of an IPC functioning as an IPC manager 810 of the power network (such as depicted in FIGS. 2 and 3) and facilitating automated control of the power network through the generation of final predictive process models. As illustrated, IPC manager 810 accesses and/or receives one or more self-identifying data streams 840 from, for instance, other IPCs of the power network (e.g., self-identifying data streams 430 from IPC 210 of FIG. 4). IPC manager 810 references these self-identifying data streams 840 in performing processing (described below) to facilitate automated control of the power network. As a result of this processing, IPC manager may produce a set of final predictive process models 870, which may be output to, received by, and hosted on one or more appropriate IPCs of the power network.

In another embodiment, an IPC manager may function to perform optimization processing. An IPC manager functioning to perform optimization processing may utilize one or more final predictive process models hosted by the IPCs of the power network to perform optimization processing for controlling one or more control points of the power network. The optimization processing may generate one or more control signals which may be output to and received by one or more appropriate IPCs (e.g. as control signals 490 of FIG. 4) to control one or more control points of the power network. An appropriate IPC may be, for instance, the IPC associated with the component(s) to be controlled by the control signals. Further discussion of optimization processing is described below with reference to FIG. 12.

In yet a further embodiment, an IPC manager may function to perform limit request processing. Limit request processing may also generate one or more control signals to control one or more control points of the power network. Further discussion of limit request processing is described below with respect to FIG. 13.

While one IPC manager may be provided to perform the generation of predictive process models, optimization processing, and limit request processing, it may be advantageous to provide multiple different IPC managers to function to perform each function. Providing different IPC managers to perform the different functions may, for instance, help to avoid a single point of failure. In this manner, one or more IPC manager(s) can facilitate control of a power network, for instance through generation of final predictive process models, optimization processing, and/or limit request processing to control various control points of the power network by communicating control signals to the distributed IPCs of the power network.

In one embodiment, IPC manager 810 facilitates automated control of the power network by generating a set of final predictive process models to be deployed. To facilitate generating final predictive process models, IPC manager 810 includes a modeler 850. Modeler 850 may contain a library of one or more user-defined model templates 852 used by modeler 850 to create at least one predictive process model for facilitating automated control of the power network. As described above, predictive process models can be hosted on an IPC and later be employed by an IPC manager to generate control signals to control operation of a component with which an IPC is associated. The control signals issued from an IPC manager may cause a receiving IPC to issue appropriate control signals 490' (FIG. 4) to control operation of one of more control points. Predictive process models define a cause and effect relationship that can be used to determine whether and when to generate one or more control signals for controlling a component. In one embodiment, a predictive process model is a neural network or linear regression that maps the associated component's behavior as a function of specific predictive process model inputs. Predictive process models may be built backwards in the sense that the process inputs are modeled as a function of the process outputs. For example, it might be desirable to develop a predictive process model that predicts fuel inflow as a function of power output and ambient conditions, rather than a traditional model that predicts the power output as a function of fuel input. Backwards modeling makes it easier to identify potential problems through, in this example, observation of incoming fuel flow to achieve a particular current and voltage.

Different predictive process model types may be created from different model templates, such as model templates 852 of IPC manager 810. A model template allows self-generation of predictive process models without human input other than to program the model template itself. Consequently, the model templates 852 of modeler 850 may be reprogrammed, for instance by adding, deleting, or modifying model templates 852, to dictate the type of predictive process models generated therefrom. Since predictive process models form the building blocks to generate control signals, the goals to be achieved by the IPC manager(s) in managing the network may be dictated by the model templates 852 of modeler 850. An example of a model template used to generate predictive process models is described below with reference to FIG. 9.

FIG. 9 depicts one example of a model template utilized by Modeler 850 of IPC manager 810 of FIG. 8 to generate one or more predictive process models. In this example, model template 900 is used to create an estimation of fuel use of a generator based on the generator output and the rated capacity. Model template 900 comprises a header portion 901, pattern matching criteria portion 902, and output portion 903.

Header portion 901 describes the type of predictive process model that should be created. In the depicted example, the model type is "equation", and consequently, the header portion 901 includes an equation with generic descriptions of the data streams that should be incorporated into this particular predictive process model. The pattern matching criteria portion 902 gives the pattern matching criteria to match the generic descriptions with actual, received data streams. Patterns for matching self-identifying data stream metadata can refer to actual, dynamic values of monitored data, or they can refer to other metadata associated with that self-identifying data stream. In the example of FIG. 9, generic descriptions "GeneratorOutput" and "RatedGeneratorCapacity" are provided. These generic descriptions are compared to the self-identifying data streams received at the IPC manager (e.g., self-identifying data streams 840 of FIG. 8) to identify any self-identifying data streams that may be considered for potential inputs for the model templates. Output portion 903 describes the output of the predictive process model, and in particular, describes output metadata that will ultimately be ascribed to the predictive process model. That is, the predictive process model itself can be processed as a dynamic, monitored data stream and the metadata of the model can be used in subsequent passes through the model creation program to chain models together. In this example, a predictive process model generated from model template 900 will have an output of "estimated-fuel-use". Model templates may be stored in a simple language file such as XML than can be easily edited, modified, and/or replicated for creating other model templates.

Continuing with FIG. 8, when generating a set of final predictive process models, modeler 850 generates at least one predictive process model using model templates 852. In operation, modeler 850 may automatically generate a relatively large collection of predictive process models, called a testing model collection. From the testing model collection, IPC manager generates a set of final models 855 along with any appropriate model sequences 858.

Figure 10:
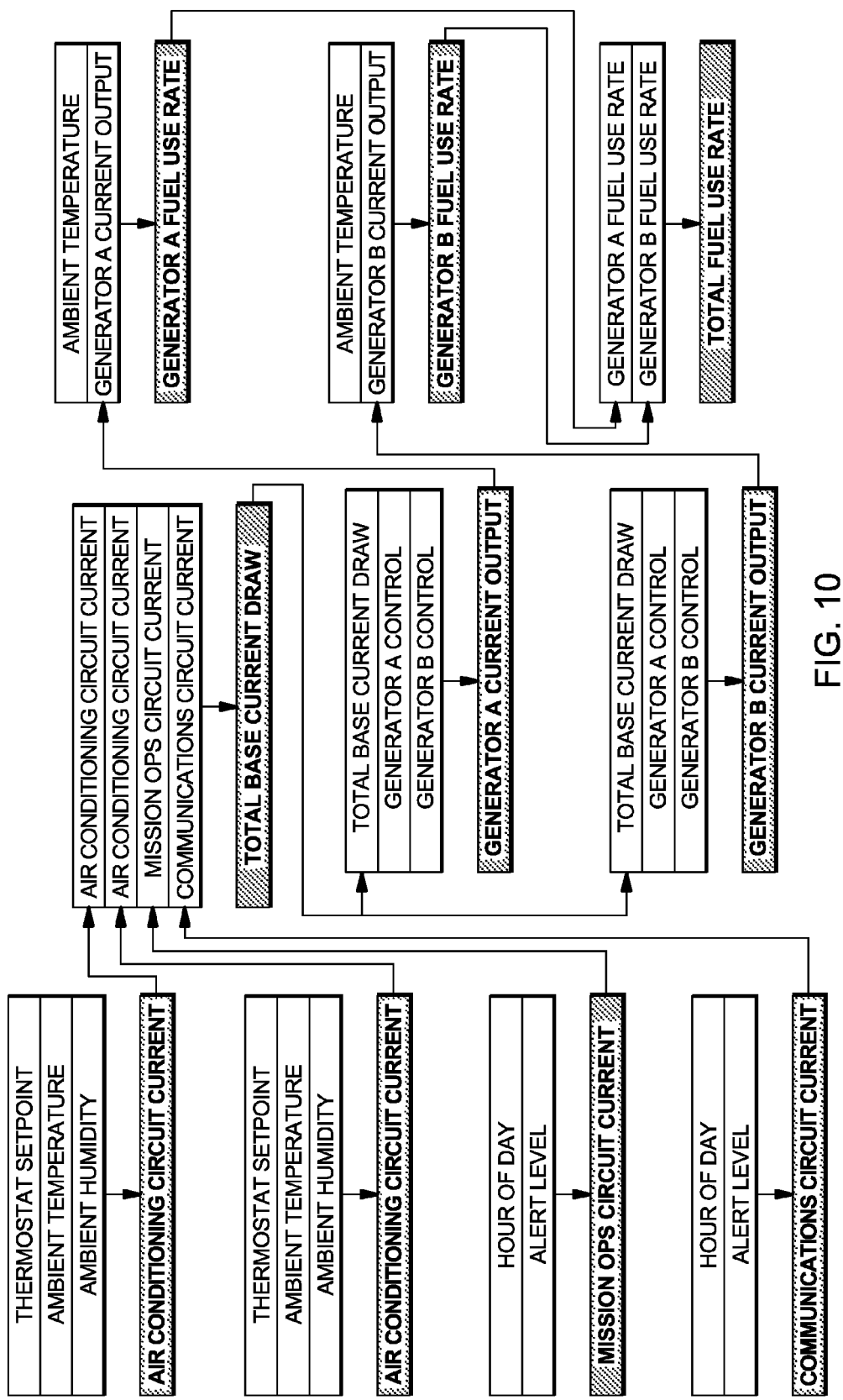
FIG. 10 depicts one embodiment of a model sequence generated by the IPC manager of FIG. 8 from multiple predictive process models, in accordance with an aspect of the present invention.

FIG. 10 depicts one embodiment of a model sequence generated by IPC manager 810 of FIG. 8. A model sequence relates predictive process models to one another to produce a logical sequence of predictive process models generated by modeler 850. It is sometimes useful to chain together a logical sequence of predictive process models so that more complex processes can be analyzed. A model sequence provides a prediction on how the various components of the power network interact with one another given a particular scenario. FIG. 10 illustrates an example of predictive process models that rely on both monitored values and outputs from other predictive process models. The sequence of FIG. 10 is used to predict the total fuel use of two generators, Generator A and Generator B, based on certain controlled variables (e.g., thermostat setpoints and generator controls), uncontrolled variables (e.g., ambient temperature, humidity), and immutable variables (e.g., alert level). A model sequence may be used by itself as part of an optimization strategy of the IPC manager to determine the effects of changing certain inputs on the outputs of the entire sequence of predictive process models of the model sequence. Additionally or alternatively, the model sequence may be related to (e.g., input for) one or more other predictive process model(s) or model sequence(s) to form a more complex predictive process model. One example of an optimization strategy that might employ the model sequence of FIG. 10 might involve, for instance, scheduling the times when Generator A will be utilized and the times when Generator B will be utilized to minimize total fuel use rate, based on the variables describe above.

Multiple such sequences may be developed that use the same predictive process models (or a subset thereof) to identify a cause and effect relationship for other outputs. Predictors may be used to estimate the output of a given process based on proposed inputs. For example, predictors are used in FIG. 10 to estimate the generator fuel consumption. The predictors use the parameters created by the predictive process models for these predictions.

The final models 855 and model sequences 858 may then be output as final predictive process models 870, hosted on one or more IPCs of the power network, and later used by a decision maker program in implementing control actions to generate control signals for controlling one or more components of the power network, as will be explained further below. The set of final predictive process models could be based on an overall action plan for the power network. The action plan may comprise one or more goals for the power network, and the IPC manager(s) of the power network will operate to manage the power network according to the goals of the action plan. For instance, one goal may be to minimize a cost function based on fuel consumption of the source components (e.g., generators), given particular constraints, such as maintaining consistent power supplied to key load components of the power network, or prioritizing which components are utilized. Another example of an overall goal is to selectively split the power network into sub-networks, or power sub-grids, with each grid comprising its own set of source components and load components. One advantage to creating sub-networks is that it increases utilization of source components. This is advantageous when source component efficiency diminishes as utilization rate decreases.

Once the set of final predictive process models have been deployed to the appropriate IPCs of the power network, one or more IPC manager(s) may perform optimization processing and/or limit request processing to generate control signals to implement the action plan. As described above, control signals may be distributed from one or more IPC manager(s) to the IPCs in the power network (e.g. as control signals 490 of FIG. 4). The control signals are selectively sent to various IPCs in the power network, for instance to IPCs associated with affected components (i.e., those components of the power network comprising the control points to be adjusted by the control signals). An IPC 210 (FIG. 4) receiving control signals 490 from an IPC manager may relay the control signals, for instance, (or is caused to generate appropriate control signal(s)) in order to effectuate the control signals 490 dictated by the IPC manager. For instance, the IPC may output control signals 490' to the control point(s) of the component. A control signal to control a control point of a component may emanate from an IPC manager in the form of a control signal 490 that is received by a receiving IPC associated with the component, and then may be output to the control point of the component as a control signal 490' from the receiving IPC. It should be understood that a control signal 490 emanating from an IPC manager may be in one form and that the receiving IPC (e.g. IPC 210) may issue control signal(s) in a modified, new, and/or different form, for example, to accomplish the task of controlling the control point. This facilitates providing control signal from an IPC manager in one format, for example a standardized format that may be recognized by any receiving IPC, and providing control signals from the receiving IPC 210 in another format, for instance a format particular to the control point being controlled by the receiving IPC. Alternatively, the IPC could function as a pass-through for control signals 490, wherein the control signals 490 are simply relayed by the IPC and output as control signals 490' to the control points. Additionally, if an IPC manager is associated with a component of the power network that is to be controlled by a control signal of the IPC manager, the IPC manager may itself issue a control signal (e.g. control signal(s) 490' of FIG. 4) to control a control point of the component with which the IPC manager is associated. In this manner, the IPC manager may directly issue control signals to a control point.

Figure 11A:
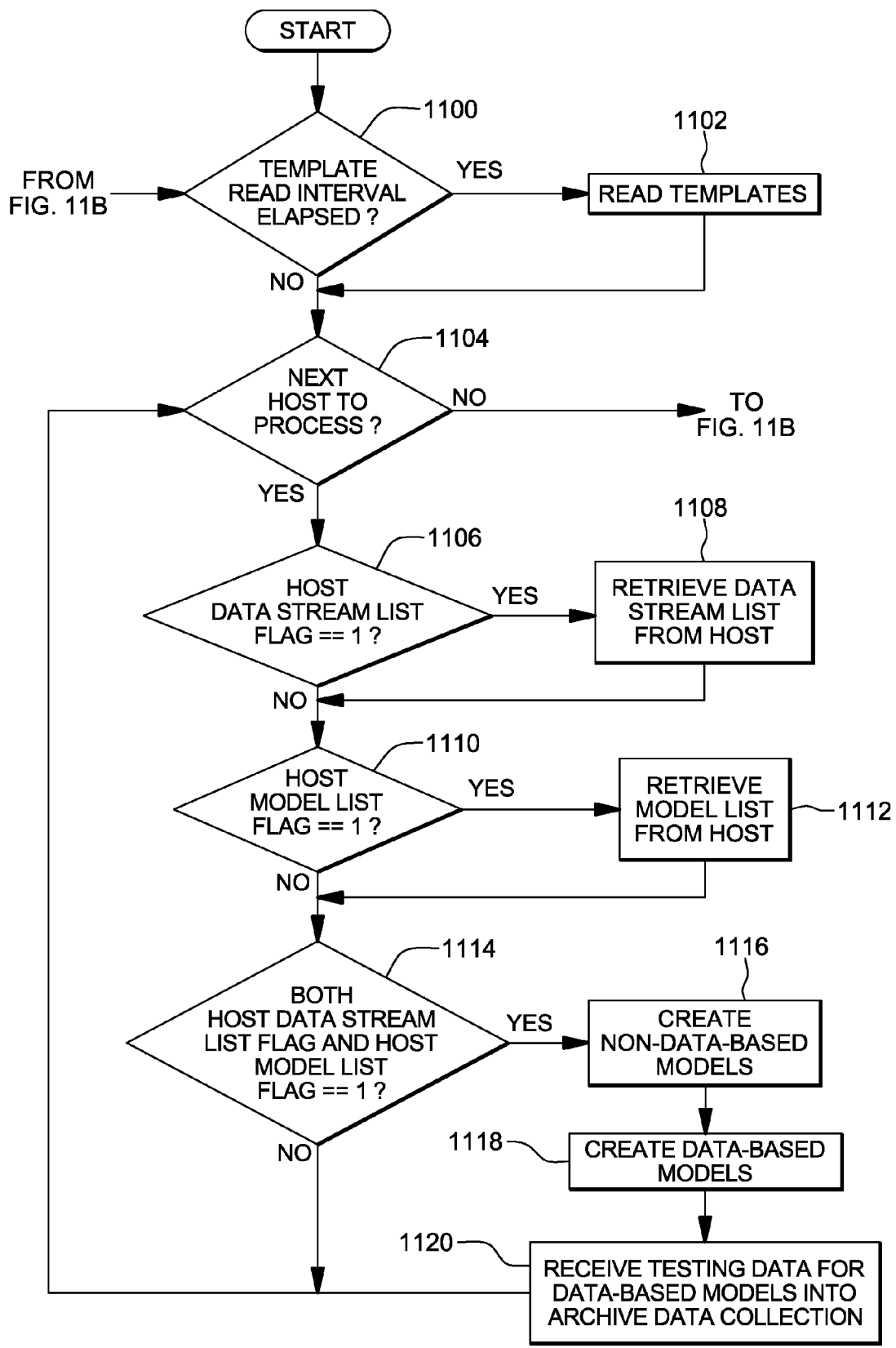
FIGS. 11A and 11B depict one embodiment of processing performed by the IPC manager of FIG. 8 to generate a set of final predictive process models to facilitate automated control of the power network, in accordance with an aspect of the present invention.
Figure 11B:
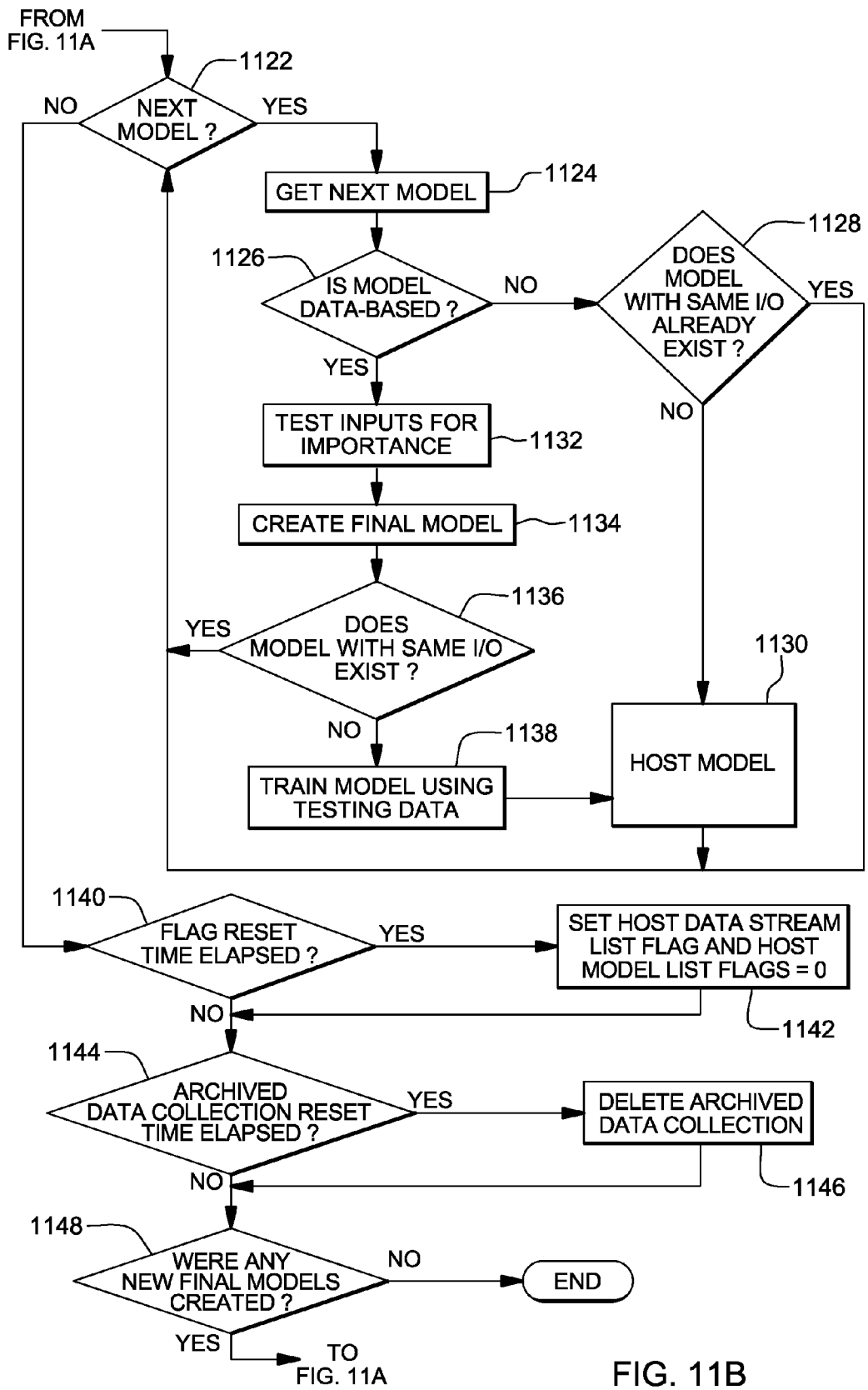

FIGS. 11A and 11B collectively depict one embodiment of processing performed by the IPC manager of FIG. 8 to generate a set of final predictive process models to facilitate automated control of the power network in accordance with an aspect of the present invention. Processing begins at STEP 1100 with the IPC manager checking whether a template read interval has elapsed. The template read interval dictates how often the IPC manager checks whether there has been a change to the model templates (e.g., model templates 852 of FIG. 8). Such a change to the model templates would likely result in the generation of a different set of predictive process models by the modeler of the IPC manager. If the template read interval has elapsed, then the model templates are read, STEP 1102. After the model templates are read, or if the template read interval has not yet elapsed, the IPC manager determines whether there is a next host to process, STEP 1104. A next host refers to a next IPC of the power network that may produce one or more self-identifying data streams for consideration by the IPC manager generating the set of final predictive process models. When the IPC manager processes a host (i.e., a next IPC), predictive process models are generated based on the self-identifying data streams of that host. The predictive process models are added to the testing model collection which is later used to generate a set of final predictive process models used to implement an action plan.

Assuming that there is a next host to process, the IPC manager checks, at STEP 1106, whether the host data stream list flag is equal to 1. The host data stream list flag is used to direct the IPC manager to update the list of self-identifying data streams it recognizes as emanating from the particular host. This flag may be reset (i.e., to 0) from time to time to direct the IPC manager to retrieve/update the list of self-identifying data streams emanating from the particular host. If the host data stream list flag is equal to 1, then the data stream list is retrieved from the host, STEP 1108. Afterwards, or if the host data stream list flag is equal to zero, processing continues to STEP 1110, where the IPC manager checks whether the host model list flag is equal to 1. The host model list flag is used to direct the IPC manager to update the list of predictive process models it recognizes as being hosted by the particular host. As described above, IPCs may host predictive process models which may be employed in producing control signals to control operation of components of the power network. The predictive process models already hosted at an IPC may have been generated previously, for instance by the same or a different IPC manager as part of a previous optimization routine to generate a set of (previous) final predictive process models, or by the IPC itself. The host model list flag may be reset (i.e., to 0) from time to time to direct the IPC manager to retrieve/update the list of predictive process models being hosted by the particular host. If the host model list flag is equal to 1, then the model list is retrieved from the host, STEP 1112.

Afterwards, or if the host model list flag was equal to 0, processing continues to STEP 1114, where the IPC manager checks whether both the host data stream list flag and the host model list flags are equal to 1. If both flags are equal to 1, the IPC manager builds non-data-based predictive process models, STEP 1116, and data-based predictive process models, STEP 1118, based on model templates of the IPC manager, and stores them to a testing model collection. The testing model collection is a collection of possible predictive process models that might be employed in implementing the action plan for the power network. It represents the matching of the self-identifying data streams received at the IPC manager with the patterns listed in the model templates 852, and forms the sample space from which the IPC manager generates the set of final predictive process models that are employed as part of the action plan. The testing model collection comprises both non-data-based and data-based predictive process models. Non-data-based predictive process models are those that are not based on data from data sources but are instead based on one or more equations. The model template of FIG. 9 produces non-data based models because it is of model type "equation". In contrast, there are models that are data-based, such as regressions or neural networks that use historic testing data, for instance monitored data values observed in the power network, to map inputs to outputs in the predictive process model. The testing data associated with any data-based predictive process models created at STEP 1118 must be retrieved into an archived data collection of the IPC manager, STEP 1120, from the relevant IPCs to make the data-based predictive process models useful. Processing then continues back to STEP 1104 to determine whether there is a next host to process, and processing continues until all hosts have been processed. The result of processing all hosts is a testing model collection populated by all predictive process models generated from processing all hosts (i.e., IPCs) in the power network.

Once all hosts have been processed, then processing continues from STEP 1104 to the steps of FIG. 11B. FIG. 11B depicts processing to create the set of final predictive process models that will be hosted on the individual hosts (e.g., IPCs) of the power network. Statistical analysis may be employed by the IPC manager to determine the final predictive process models that should be hosted at the IPCs of the power network. Once the final predictive process models are hosted at the IPCs of the power network, an IPC manager may employ computational algorithms to determine control signals to be sent to control one or more components of the power network. For example, linear programming may be used to cycle through a large number of possible operations and the sequence of operations with the lowest cost may then be chosen and implemented. In this way, scenario evaluation may be conducted using the up-to-date data (i.e., monitored data values received from the IPCs) to simulate inputs to the predictive process models and generate predicted outputs. The predicted outputs may be considered when determining lowest costs and choosing and deploying control signals to the control points of the power network. The computational algorithms account (in one embodiment) for the following: priority ranking of load components and how data streams associated with these load components can be identified; in-situ learning by the IPC manager of the load profiles of the load components, and specifically, what load shapes can be expected from the load components given variances in controllable and uncontrollable variables; evaluating what happens when the power network is reconfigured, for instance with the addition or subtraction of power components; and estimating the available source component capacity based on ambient and power network conditions, and the status of that capacity.

The process to create the set of final predictive process models iteratively examines each predictive process model in the testing model collection to test for importance. Beginning at STEP 1122, the IPC manager determines whether there is a next predictive process model to process. If so, the next predictive process model is retrieved, STEP 1124. The IPC manager then determines whether the predictive process model is data-based, STEP 1126. If the predictive process model is not data-based, a check is performed, STEP 1128, to determine whether a predictive process model with the same inputs and outputs is already being hosted at a host, and if so, processing continues to a next predictive process model, STEP 1122. Otherwise, if a predictive process model with the same inputs and outputs is not already being hosted at a host, then the appropriate host is chosen and the predictive process model is hosted on the host, STEP 1130, before continuing back to STEP 1122. Hosting the predictive process model comprises, for example, transmitting the predictive process model to the host IPC.

The predictive process models may be hosted at the individual IPCs of the power network, as opposed to, for instance an IPC manager generating the predictive process models, for a variety of reasons. As examples, it may avoid a single point of failure if an IPC manager hosting all models crashes, it helps to distribute among the IPC platforms the computational burden of updating the predictive process models with recent data, and it helps to minimize the amount of information that is transferred between IPCs after the final models are hosted.

Continuing to STEP 1126, if it is determined that the predictive process model is data-based, then the data retrieved from the host and stored in archived data collection (STEP 1120 above) is used to test importance of inputs to the predictive process model, STEP 1132, that is, to determine whether they are valid and useful. For example, there may be hundreds of different permutations but only one final predictive process model for which there is a relation between the inputs and the outputs of the predictive process model which is selected, STEP 1134. This is done through, for instance, statistical analysis of the retrieved data. At STEP 1136, a check is performed to determine whether a predictive process model with the same inputs and outputs as the selected final predictive process model is already being hosted at a host. If so, processing continues to a next predictive process model, STEP 1122, otherwise processing continues to STEP 1138 wherein the data from the archive data collection is used to train the final process model. Training comprises removing from consideration for this final predictive process model any non-meaningful data (for example, outliers) and then training the final predictive process model, e.g., by finding the coefficients of the regression or neural network by mapping the target dependent (i.e., output) values of the model to the model's independent (i.e., input) values. Once the final predictive process model is trained, processing continues to STEP 1130 where the appropriate host is chosen and the model is hosted on the host, as above, and continues back to STEP 1122.

At STEP 1122, when there are no next predictive process models to process, processing continues to STEP 1140 where a check is made to determine whether a flag reset interval has elapsed. If so, the host data stream list flag and host model list flag of all hosts is set to 0. In this manner, the flags associated with retrieving updated self-identifying data stream lists and updated predictive process model lists from the IPCs of the power network may be cleared from time to time to direct the IPC manager to refresh the lists. Processing continues to STEP 1144, where a check is made to determine whether an archived data collection reset time has elapsed, and if so, the archived data collection is deleted, STEP 1146. In this manner, the archived data on which data-based predictive process models are based (e.g., testing inputs for importance and by setting their coefficients) may be refreshed, thereby forcing an update of the data stored in the archived data collection to ensure that data-based final predictive process models are based on the most recently-observed behavior of the components of the power network. One example of an archived data collection reset time is 24 hours, to direct data retrieval and archival from the individual IPCs on a daily basis. Likewise, the flag reset time (of STEP 1140) and template read time (of STEP 1100) intervals may be set according to how frequently the self-identifying data stream list, predictive process models list, and model templates should be refreshed.

At STEP 1148, a determination is made as to whether any new final predictive process models were created since last time the IPC manager performed this optimization process. If so, it is an indication that something used by the processing was or is being updated (i.e., data of the archived data collection, data stream list or model list of a host, model templates of the model manager). Such updating might cause a different (i.e., better optimized) set of final predictive process models to be created. Thus, if new final predictive process models were created since last optimization routine process, then processing returns to STEP 1100 to repeat the entire process. If no new final predictive process models have been created since the last optimization processing, indicating that the final predictive process models just created yield the set of predictive process models most optimized for implementing the action plan given the current data and the current model templates programmed on the IPC manager generating the set of final predictive process models, processing ends.

After the predictive process models are hosted on the appropriate IPCs of the power network, one or more IPC manager(s) may occasionally (e.g. on a set schedule or timer) generate control signals for controlling one or more control points of one or more components of the power network. In one embodiment, an IPC manager functions to perform optimization processing by employing the predictive process models hosted at the IPCs to generate one or more control signals. In another embodiment, an IPC manager functions to perform limit request processing to generate one or more control signals based on limit requests.

One or more IPC manager(s) may be provided to provide optimization processing and/or limit request processing. As discussed above, IPC manager may be selected based on, for example, an IP address, or using any other mechanism for selecting an IPC manager. Additionally, each IPC in the power network may be configured to assume the role of an IPC manager, for instance an IPC manager to perform optimization processing and/or limit request processing as will be described below. In this manner, the automated control facility may be distributed across the power network in a decentralized manner without dependency on any single IPC, to provide a dynamic automated control facility.

It may be advantageous to provide different IPC managers to function in different ways. For example, it may be advantageous for one IPC manager to function to generate the set of final predictive process models, another IPC manager to function to perform optimization processing, and a third IPC manager to function to perform limit request processing. Choosing different IPC managers to function in different capacities may help to avoid a single point of failure in the power network in case an IPC manager crashes. It should be understood, however, that the invention may be fully implemented in any number of IPC managers, including only one IPC manager, to perform the generation of final predictive process models, the optimization processing, and the limit request processing.

In order to facilitate optimization processing and limit request processing, data may be continually collected at the IPCs from one or more data sources. The type of data collected may be, for instance, dictated by the particular predictive process models hosted on the IPC. The data collected may be important to determining how to control the various components of the power network to achieve the desired goals, just as it was to determining which predictive process models are chosen to be hosted at the individual IPCs when generating the set of final predictive process models. Providing updated data facilitates generation of control signals that will most optimize control of the power network given the most up-to-date data.

Before an IPC manager performs either optimization processing or limit request processing to generate control signals, a check may be performed for whether the list of IPC hosts has changed. If so, a host data stream flag and/or a model list flag corresponding to each host in the power network may be cleared, as was discussed above with respect to FIG. 11A. The flags may be cleared to direct the IPC manager performing the processing to retrieve a list of data streams from all hosts and/or a list of models from all hosts. This ensures that an IPC manager performing optimization processing or limit request processing utilizes the most up-to-date set of data streams and models of the power network in generating control actions. Once the updates are processed, or if there was no change to the IPC host list, an IPC manager may perform optimization processing and/or limit request processing to generate control signals, which are described in FIGS. 12 and 13 below.

Figure 12:
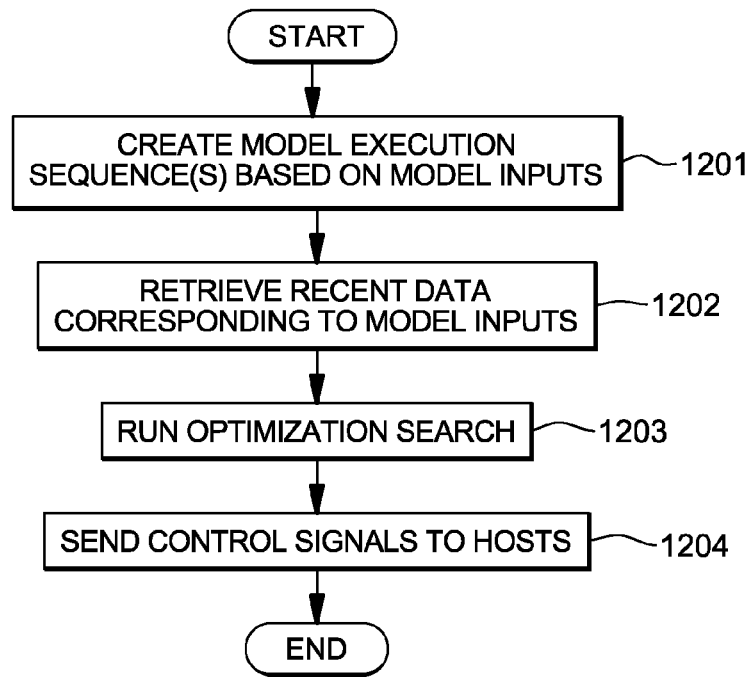
FIG. 12 depicts one example of optimization processing by an IPC manager employing hosted predictive process models to generate control signals for automatically controlling one or more components of the power network, in accordance with an aspect of the present invention.

FIG. 12 depicts one example of optimization processing by an IPC manager employing hosted predictive process models to generate control signals for automatically controlling one or more components of the power network, in accordance with an aspect of the present invention. Optimization processing may be facilitated by, for instance, a decision maker program of an IPC manager, such as decision maker program 460 (FIG. 4). A decision maker program uses both a set of monitored data values observed in the power network (for instance data values received from other IPCs of the power network via received self-identifying data streams 840) along with final predictive process models and model sequences hosted at the IPCs of the power network to decide on and implement an action plan. The optimization processing involves the minimization of a cost function wherein a vector of potential control actions (e.g. control signals that IPC manager considers issuing) is examined and yields a predicted cost of system operation under that vector of control actions. The hosted predictive process models are used as surrogates for the system response (i.e. given a set of inputs, the predictive process models yield a set of predicted outputs, or responses, by the power network). In this manner, scenario evaluation may be conducted to predict the behavior of the power network in response to a particular set of control actions. The vector of control actions that minimizes the cost function may be selected, and the IPC manager may generate from this vector optimized control signals, conforming to the overall action plan to be implemented by the IPC manager(s) of the power network, for deployment to the IPCs.

Processing begins at STEP 1201 where the IPC manager creates one or more model execution sequence(s) based on model inputs. These may be similar to the model sequences described above with respect to FIG. 10, and facilitate an evaluation of more complex processes for a predicted reaction of the system to proposed inputs. Once the model execution sequence(s) are created, the IPC manager retrieves all recent data corresponding to the model inputs, STEP 1201. This enables the IPC manager performing the optimization processing to consider, for instance, any data more recent than was considered during the generation of the set of final predictive process models. Once the recent data is retrieved, IPC manager runs an optimization search of control actions using, for example linear programming, and generates optimized control signals, as discussed above, to send to the IPC hosts. This analysis could be performed using, for instance, a gradient descent search, linear programming, brute-force searching, and/or any optimization similar to that described above when generating the set of final predictive process models. The overall goal of this analysis is to simulate specific control actions, in the form of control signals, and determine the effects on the system of those control actions. A result of this analysis is a set of control signals that most optimally satisfies the goals of the action plan. The control signals are then deployed to the individual hosts, STEP 1204, after which processing ends.

Figure 13:
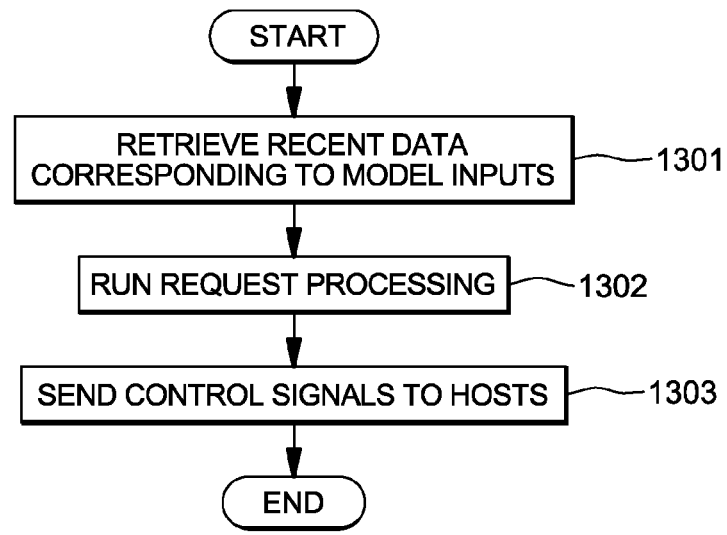
FIG. 13 depicts one example of limit request processing by an IPC manager to generate control signals for automatically controlling one or more components of the power network, in accordance with an aspect of the present invention.

FIG. 13 depicts one example of limit request processing by an IPC manager to generate control signals for automatically controlling one or more components of the power network, in accordance with an aspect of the present invention. Limit requests are simple heuristics that determine a control signal to be issued if an output of a process model exceeds a particular limit or threshold. These requests may be associated with controllable points through metadata pattern matching, and may be defined using, for instance, model templates such as those described above. In this regard, a limit request may not require employing a hosted predictive process model, and instead rely simply on the updated data to determine whether a control signal should be issued. An example of a limit request to process may a request that if a particular component begins to operates above a certain threshold operating level, the component should be turned off. When a request is identified, the IPC manager searches through the available self-identifying data streams to find any control points that match the request parameters. If any appropriate self-identifying data streams are found, command signals may be issued to satisfy the limit request. Limit requests may prompt binary-based requests, such as device dispatch or curtailment of on/off devices, which may be achieved immediately through a control signal. Alternatively, they may prompt analog control signals to increment or decrement a control every time the limit request is made.

Processing in FIG. 13 begins at STEP 1301 where, as before, the IPC manager retrieves all recent data corresponding to the model inputs. In this example, the model inputs might be defined limit requests to process. At STEP 1302, the IPC manager performs limit request processing. This may involve, for instance, searching through the available self-identifying data streams of the power network to identify control points that should be controlled, given the recent data received and the limit request(s) being processed. At STEP 1303, appropriate control signals are sent to the appropriate hosts, as dictated by the limit requests, after which processing ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 14:
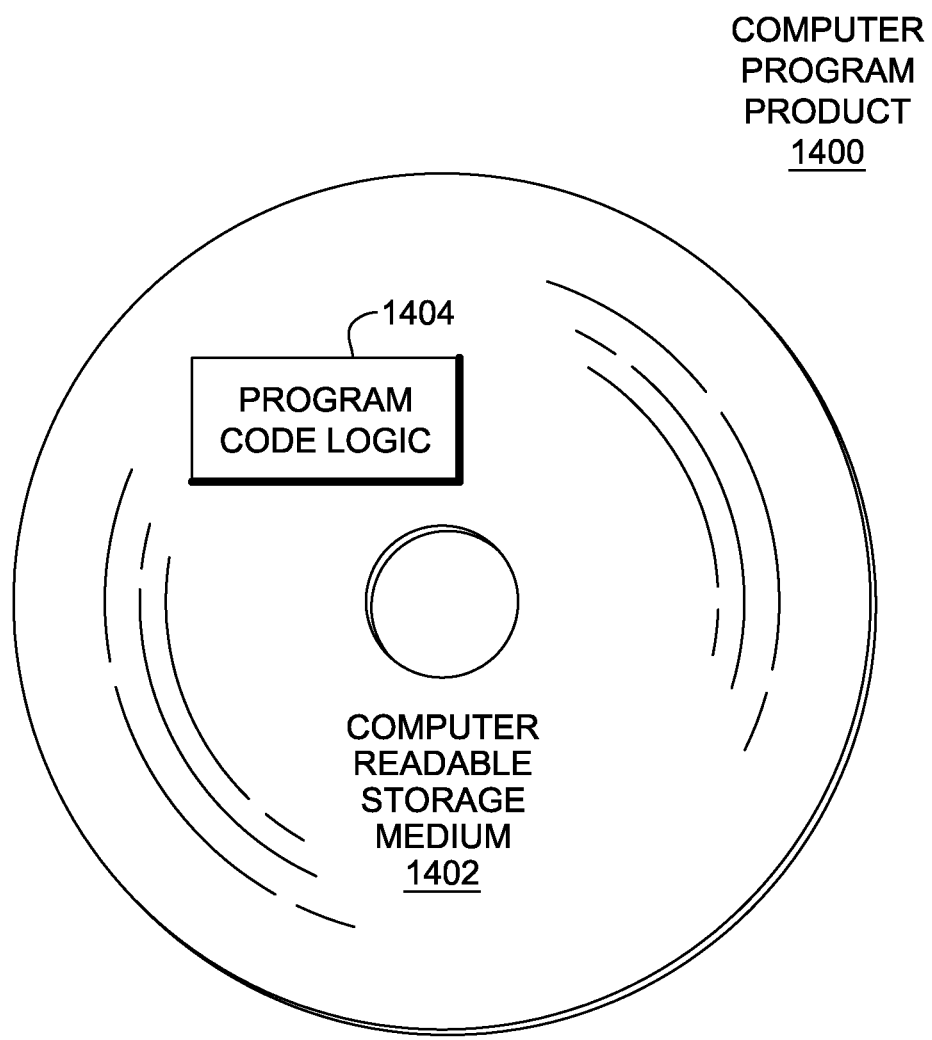
FIG. 14 depicts one embodiment of a computer program product incorporating one or more aspects of the present invention.

Referring now to FIG. 14, in one example, a computer program product 1400 includes, for instance, one or more computer readable media 1402 to store computer readable program code means or logic 1404 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the intelligent power controllers, partly on the intelligent power controllers, as a stand-alone software package, partly on the intelligent power controllers and partly on a remote computer or entirely on the remote computer or server. In the latter scenario, the remote computer may be connected to the intelligent power controllers through any type of network, including a local area network (LAN) or a wide area network (WAN), or the connection may be made to an external computer.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of facilitating automated control of a power network, the method comprising:
    providing multiple intelligent power controllers (IPCs) associated with multiple components of the power network, each IPC being associated with a different component of the multiple components of the power network;
    obtaining at least one raw data stream from at least one data source of at least one component of the multiple components, the at least one raw data stream representative of at least one operational aspect of the at least one component of the multiple components; and
    automatically associating, by the at least one IPC associated with the at least one component, metadata with the at least one raw data stream to produce at least one self-identifying data stream, the metadata describing one or more characteristics of the at least one raw data stream, and the at least one self-identifying data stream facilitating automated control of the power network.

2. The method of claim 1, wherein the obtaining comprises obtaining multiple raw data streams representative of multiple operational aspects of the at least one component of the multiple components and the automatically associating comprises automatically associating, by the at least one IPC associated with the at least one component, different metadata with the multiple raw data streams to produce multiple different self-identifying data streams which facilitate automated control of the power network.

3. The method of claim 1, further comprising referencing the at least one self-identifying data stream of the at least one IPC by another mc, of the multiple IPCs, wherein the at least one self-identifying data stream referenced by the another IPC facilitates automated control of the power network.

4. The method of claim 3, further comprising automatically selecting the another IPC of the multiple IPCs to be an IPC manager which facilitates automated control of the power network.

5. The method of claim 3, wherein the another IPC comprises at least one model template which facilitates generating at least one predictive process model for use in automated control in the power network, the at least one predictive process model facilitating automated evaluation of potential control actions to control operation of one or more components of the multiple components of the power network.

6. The method of claim 5, wherein the generating comprises generating multiple predictive process models, including non-data-based predictive process models and data-based predictive process models, and wherein the at least one self-identifying data stream is employed by the another IPC in generating at least one data-based predictive process model.

7. The method of claim 6, wherein the another IPC;
    relates at least two predictive process models of the multiple predictive process models to one another to produce a logical sequence of predictive process models; and
    relates the logical sequence of predictive process models to another predictive process model of the multiple predictive process models.

8. The method of claim 5, further comprising employing the at least one predictive process model by one or more IPCs of the power network in controlling one or more control points associated with one or more of the multiple components, and wherein the at least one predictive process model facilitates automated evaluation by providing a prediction of behavior of components of the power network should one or more potential control actions be implemented to control operation of one or more components of the multiple components of the power network, the at least one predictive process model utilizing at least one of a linear regression or a neural network in mapping a predicted component behavior as a function of predictive process model inputs.

9. The method of claim 8, wherein the employing comprises using the at least one predictive process model to produce at least one control signal for controlling one or more control points associated with one or more of the multiple components.

10. The method of claim 1, further comprising automatically selecting one IPC of the multiple IPCs as an IPC manager of the power network and accessing by the IPC manager of the power network the at least one self-identifying data stream to facilitate automated control of the power network.

11. The method of claim 10, further comprising generating, by the IPC manager of the power network, at least one predictive process model for use in automated control of one or more control points associated with one or more components of the multiple components, the at least one predictive process model facilitating an evaluation of potential control actions to control the one or more control points associated with the one or more components of the multiple components, and the generating comprising using at least one model template of the IPC manager of the power network and the at least one self-identifying data stream to generate the at least one predictive process model.

12. The method of claim 1, wherein the metadata further describes one or more characteristics of the at least one component of the multiple components.

13. The method of claim 1, wherein the metadata of the at least one self-identifying data stream comprises for each self-identifying data stream at least a data stream name for the corresponding raw data stream.

14. A method of facilitating automated control of a power network, the method comprising:
    providing multiple intelligent power controllers (IPCs), each IPC being coupled to a respective component of multiple components of the power network and at least one IPC of the multiple IPCs being operable to:

access at least one raw data stream representative of at least one operational aspect of the respective component of the multiple components of the power network;

automatically associate metadata with the at least one raw data stream to produce at least one self-identifying data stream accessible by other IPCs of the multiple IPCs, the metadata describing one or more characteristics of the at least one raw data stream;

access self-identifying data streams of other IPCs of the multiple IPCs;

facilitate automated control of the power network, responsive to being selected IPC manager of the power network, using the self-identifying data streams to generate at least one predictive process model from at least one model template, the at least one predictive process model facilitating an evaluation of one or more potential control actions to control one or more components of the multiple components of the power network; and automatically control the power network, responsive to being selected IPC manager of the power network, by employing one or more predictive process models in evaluating the one or more potential control actions, and producing a set of control signals based on the evaluation of the one or more potential control actions, the set of control signals controlling one or more control points associated with one or more components of the multiple components of the power network.

15. The method of claim 14, further comprising automatically selecting, by the multiple IPCs, one IPC of the multiple IPCs to operate as IPC manager of the power network and accessing by the IPC manager at least one self-identifying data stream of at least one other IPC of the multiple IPCs in generating at least one predictive process model for use in automated control of one or more control points associated with one or more components of the multiple components, the at least one predictive process model facilitating an evaluation of potential control actions to control the one or more components of the multiple components, the generating comprising using at least one model template of the IPC manager of the power network and the at least one self-identifying data stream to generate the at least one predictive process model.

16. A system facilitating automated control of a power network, the system comprising:

multiple intelligent power controllers (IPCs) associated with multiple components of the power network, each IPC being associated with a different component of the multiple components of the power network, wherein at least one IPC of the multiple IPCs:

obtains at least one raw data stream from at least one data source of at least one component of the multiple components, the at least one raw data stream representative of at least one operational aspect of the at least one component of the multiple components; and automatically associates metadata with the at least one raw data stream to produce at least one self-identifying data stream, the metadata describing one or more characteristics of the at least one raw data stream, and the at least one self-identifying data stream facilitating automated control of the power network.

17. The system of claim 16, wherein the at least one IPC obtains multiple raw data streams representative of multiple operational aspects of the at least one component of the multiple components, and wherein the at least one IPC automatically associates different metadata with the multiple raw data streams to produce multiple different self-identifying data streams which facilitate automated control of the power network.

18. The system of claim 16, wherein another IPC of the multiple IPCs references the at least one self-identifying data stream, and wherein the at least one self-identifying data stream referenced by the another IPC facilitates automated control of the power network.

19. The system of claim 16, wherein another IPC of the multiple IPCs is automatically selected as an IPC manager of the power network, and wherein the IPC manager of the power network accesses the at least one self-identifying data stream to facilitate automated control of the power network.

20. The system of claim 19, wherein the IPC manager of the power network generates at least. one predictive process model for use in automated control of one or more control points associated with one or more components of the multiple components, the at least one predictive process model. facilitating an evaluation of potential control actions to control the one or more control points associated with the one or more components of the multiple components, and wherein the IPC manager of the power network uses at least one model template and the at least one self-identifying data stream in generating the at least one predictive process model.

21. A power network comprising:

multiple power components, the multiple power components comprising at least one source component and at least one load component; and an automated control system for controlling the power network, the automated control system comprising:

multiple intelligent power controllers (IPCs) associated with the multiple power components, each IPC being associated with a different power component of the multiple power components, wherein at least one IPC of the multiple IPCs;

obtains at least one raw data stream from at least one data source of at least one power componet of the multiple power components, the at least one raw data stream representative of at least one operational aspect of the at least one power component of the multiple power components; and automatically associates metadata with the at least one raw data stream to produce at least one self-identifying data stream, the metadata describing one or more characteristics of the at least one raw data stream, and the at least one self-identifying data stream facilitating automated control of the power network.

* * * * *

UNITED STATES PATENT AND TRADEMARK OFFICE
CERTIFICATE OF CORRECTION

PATENT NO. : 8,447,707 B2
APPLICATION NO. : 12/817651
DATED : May 21, 2013
INVENTOR(S) : Massie et al.

It is certified that error appears in the above-identified patent and that said Letters Patent is hereby corrected as shown below:

In the Claims

Column 21, Line 59: Claim 3 Delete "another mc," and insert -- another IPC --

Signed and Sealed this
Ninth Day of July, 2013

Teresa Stanek Rea
*Acting Director of the United States Patent and Trademark Office*